United States Patent [19]
Hsu

[11] Patent Number: 5,819,641
[45] Date of Patent: Oct. 13, 1998

[54] MULTIFUNCTIONAL FOOD PROCESSING MACHINE

[76] Inventor: Maxwell Hsu, 10F-3, No. 357, Sec. 4, Ren-Ai Road, Taipei, Taiwan

[21] Appl. No.: 815,344

[22] Filed: Mar. 11, 1997

[51] Int. Cl.$^6$ ............................... A23N 1/00; A23N 1/02; A47J 19/02

[52] U.S. Cl. ................................ 99/492; 99/511; 99/512; 99/513; 241/37.5; 241/92; 241/282.1; 366/314; 366/601

[58] Field of Search ............................ 99/489, 484, 492, 99/495, 509–513; 210/360.1, 380.1, 369; 241/36, 37.5, 92, 282.1; 366/314, 601; 494/36, 43, 56, 58

[56] References Cited

U.S. PATENT DOCUMENTS

| | | | |
|---|---|---|---|
| 4,345,517 | 8/1982 | Arao et al. | 99/511 |
| 4,506,601 | 3/1985 | Ramirez et al. | 99/511 |
| 4,614,153 | 9/1986 | Kurome et al. | 99/513 X |
| 4,681,031 | 7/1987 | Austad | 99/511 |
| 4,700,621 | 10/1987 | Elger | 99/513 X |
| 4,840,119 | 6/1989 | Caldi | 99/512 |
| 4,941,403 | 7/1990 | Cimenti | 99/492 |
| 5,289,763 | 3/1994 | Le Rouric et al. | 366/314 |
| 5,353,697 | 10/1994 | Venturati et al. | 241/37.5 |
| 5,355,784 | 10/1994 | Franklin et al. | 366/601 X |
| 5,392,699 | 2/1995 | Tai | 241/92 X |
| 5,417,152 | 5/1995 | Harrison | 99/492 |
| 5,495,795 | 3/1996 | Harrison et al. | 99/492 |

*Primary Examiner*—Timothy F. Simone
*Attorney, Agent, or Firm*—Pro-Techtor International

[57] ABSTRACT

The present invention relates to a multifunctional food processing machine, comprising: a main part, having a first tooth element on the upper side, a second tooth element around the first tooth element on the upper side and a motor, which drives a rotational movement of the first and second tooth elements, the motor being controlled by a switch; and a processing part, sitting on the upper side of the main part, the processing part having a casing, a rotatable third tooth element, which engages with the first tooth element or the second tooth element, and a processing unit, which is connected with the third tooth element, rotating therewith, and housed in the casing; wherein the processing unit rotates, as controlled by the switch, so as to process food.

16 Claims, 12 Drawing Sheets

5,819,641

MULTIFUNCTIONAL FOOD PROCESSING MACHINE

BACKGROUND OF THE INVENTION

1. Field of the Invention

The present invention relates to a multifunctional food processing machine, particularly to a multifunctional food processing machine, which is easy to dissassemble and assemble.

2. Description of Related Art

For a long time, machines have been used in the kitchens of households and have become part of the daily work there. Mixers, presses, as well as coffee, soya and rice mills have entered today's households, conveniently providing for a rich variety of food. With smaller families and an increasing health consciousness there use has become even more popular. Since various machines consume considerable space, machines which combine two or three functions have been designed. However, there are still no machines that conveniently combine a range of functions like of a juice press and a soya mill.

Conventional juice presses and soya mills are hard to assemble and disassemble. For example, in order to assemble a soya mill, one typically has to mount a main part onto a base, place a plastic disc, a centrifuge and a grinding mechanism one after another on a shaft, secure with a washer, place a lid on the top and add an inlet funnel as well as an outlet container. When the function as a juice press is required, the whole assembly process has to be undone and another setup has to be put together, making the combined use of a juice press and a soya mill cumbersome.

Moreover, a conventional juice press and soya mill is not provided with a security switch. Its safety depends on the caution of the user. If the user disassembles the machine and inattentively touches the power switch of the machine, injuries can easily happen.

SUMMARY OF THE INVENTION

An object of the present invention is to provide a food processing machine with a wide range of functions.

Another object of the present invention is to provide a food processing machine, which allows for convenient switching between single functions.

A further object of the present invention is to provide a food processing machine, which is provided with a security switch, so as to protect the user.

The present invention can be more fully understood by reference to the following description and accompanying drawings.

DETAILED DESCRIPTION OF THE PREFERRED EMBODIMENT

Referring to all Figs., the multifunctional food processing machine of the present invention mainly comprises a main part 1 and an exchangeable processing part 2, which is mounted on the main part 1 and is driven by a motor inside the main part 1. By the exchangeability of the processing part 2, the various functions of the present invention as soya, rice and coffee mill as well as for pressing and mixing juice and for cutting slices are realized.

Figure 1:
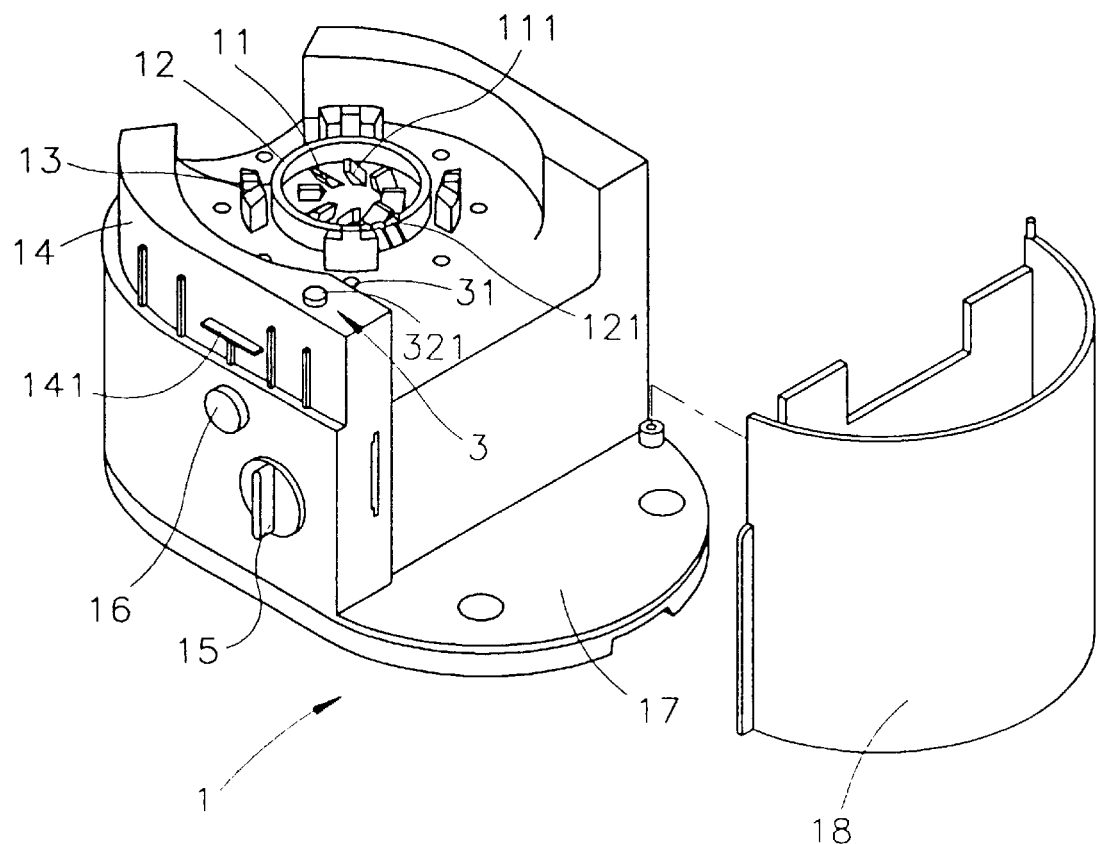
FIG. 1 is a perspective view of the main part of the multifunctional food processing machine of the present invention.

As shown in FIG. 1, the motor for driving the multifunctional food processing machine of the present invention is installed inside the main part 1. Its velocity is controlled by adjusting a switch 15. On the upper side of the main part 1, a first tooth element 11 and a second tooth element 12 are mounted, both driven by the motor and rotating around a common axis. The first tooth element 11 has several inclined protrusions 111. The protrusions 111 are arranged around the rotational axis of the tooth elements 11, 12, their mutual angular distance being equal. The second tooth element 12 is a ring-shaped protrusion, surrounding concentrically the rotational axis. It has several mutually equidistant gaps 121, extending downwards at an oblique angle.

On the upper side of the main part 1, several holders 13 are further attached. The periphery of the upper side of the main part 1 has a protruding seat 14, which holds the processing part 2. The front and the back on the outer side of the protruding seat 14 has blocking elements 141, which extend outwards and block the processing part 2 from being removed. On the outer side of the protruding seat 14 there is a release button 16 for each blocking element 141. Pressing the release button of a blocking element 141 causes the blocking element 141 to retreat into the protruding seat 14, such that the processing part 2 may be removed.

The main part 1 further has a base 17 on its lower side. The base 17 extends to the side, beyond the rest of the main part 1, and carries a container 18. The container 18 is located next to the main part 1 and is open on its upper side. It takes in residue from processing food in the processing part 2. The container 18 is hingedly connected to and separable from the main part 1.

As shown in FIGS. 4–11, the processing part 2 is for cutting food, pressing or mixing juice, or grinding rice, soya or coffee.

Figure 4:
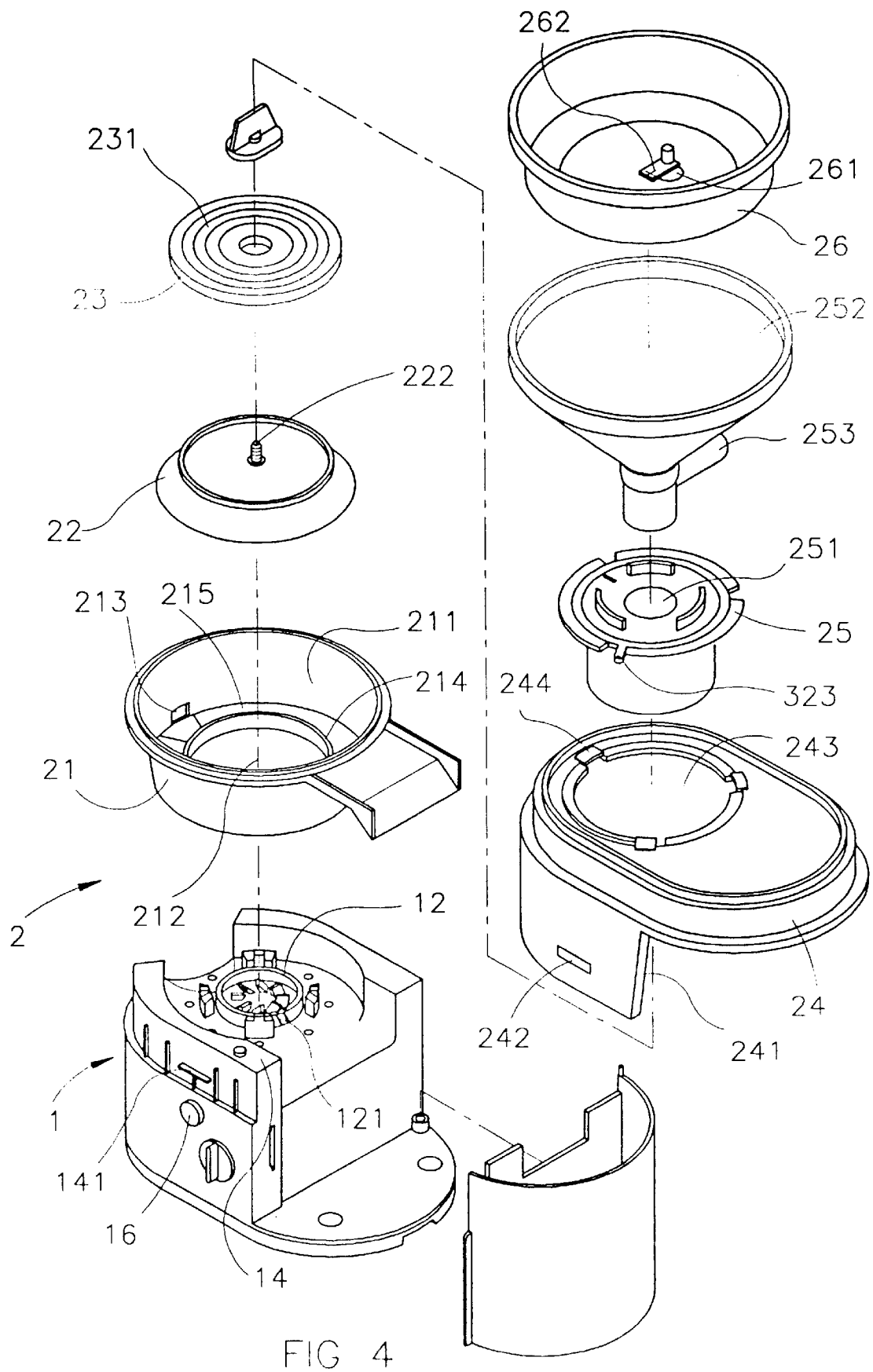
FIG. 4 is a perspective exploded view of the present invention, when used as a rice mill.
Figure 5:
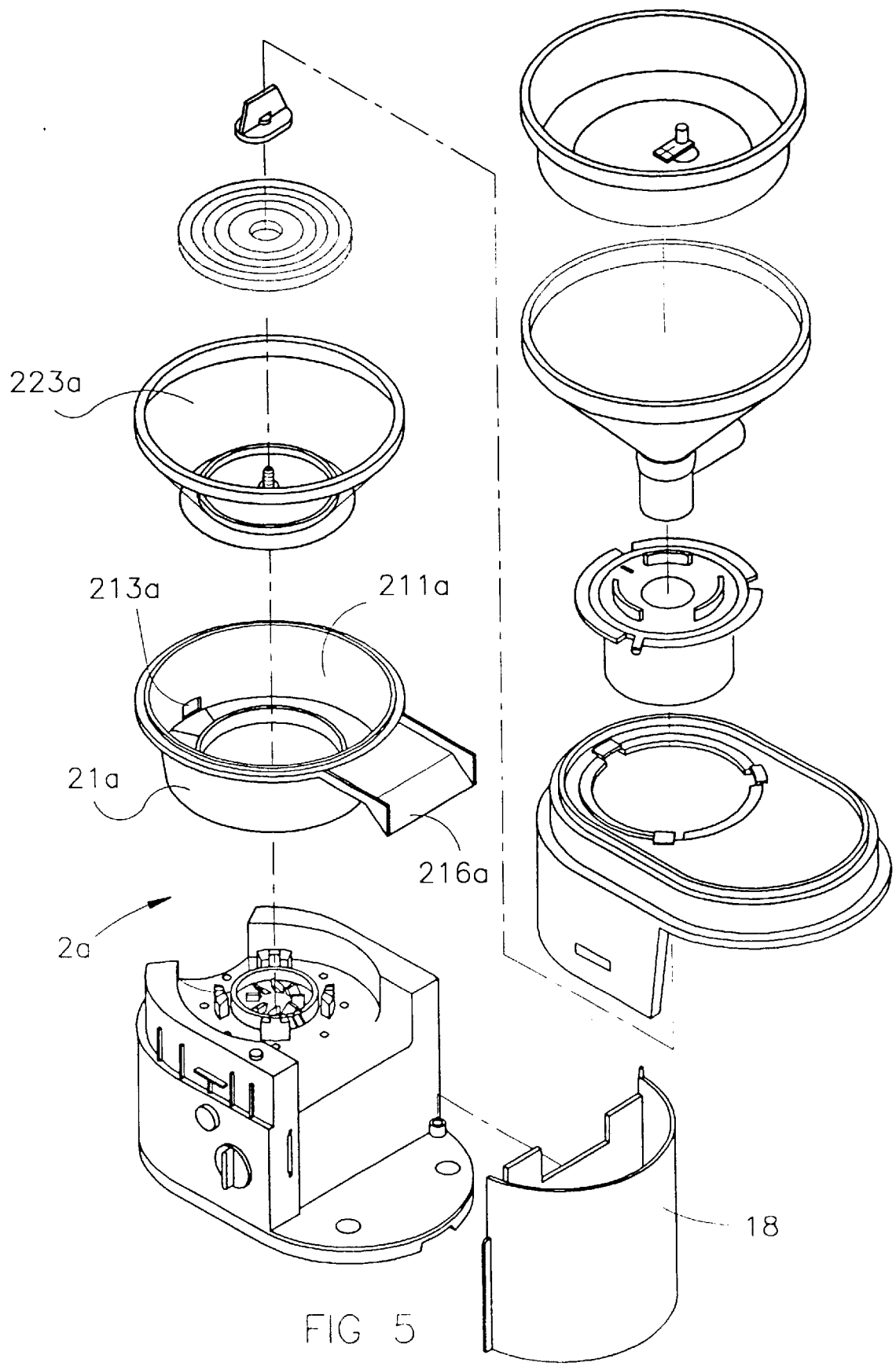
FIG. 5 is a perspective exploded view of the present invention, when used as a soya mill.
Figure 6:
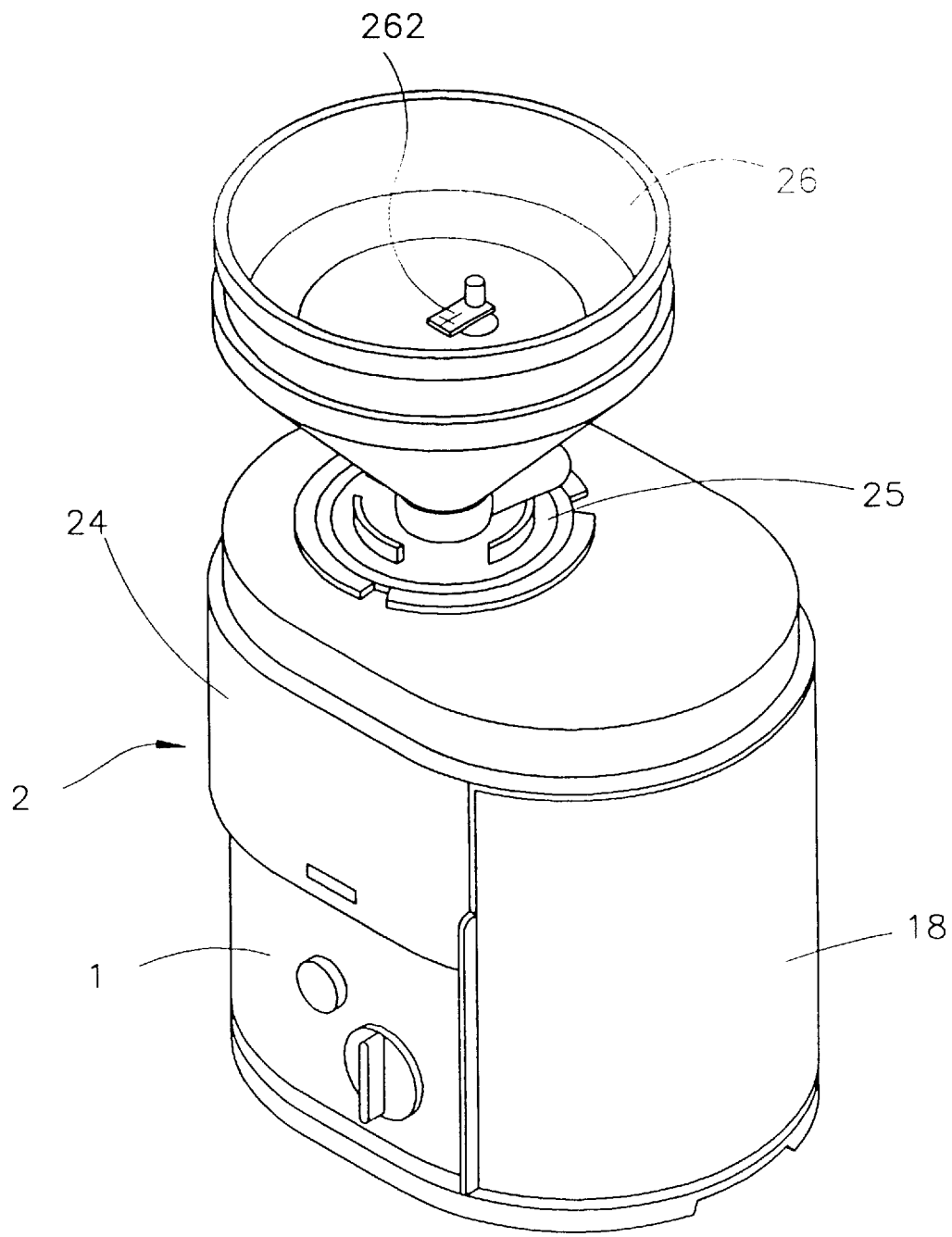
FIG. 6 is an outside view of the assembled multifunctional food processing machine of the present invention, when used as a rice or soya mill.

Referring to FIGS. 4–6, for grinding rice or soya, the processing part 2 mainly comprises a lower support 21, a carrier 22, a processing unit 23, a casing 24, an inlet 25, and a dripping dish 26. The lower support 21 has a basin 211 with a fixing hole 212 on its lower side. The basin is put on the main part 1 inside the protruding seat 14. The periphery of the fixing hole 212 surrounds the holders 13 of the main part 1, staying in contact with them, such that the lower support 21 is kept in its position. The lower support further has on its periphery close to its bottom side an outlet hole 213. On the periphery of the fixing hole 212, a rim 214 extends upward, forming a ring-like flow channel 215 with the lower side and the outer wall of the basin 211. Rice milk produced in the processing part 2 is collected in the flow channel 215 and flows out through the outlet hole 213.

Figure 2:
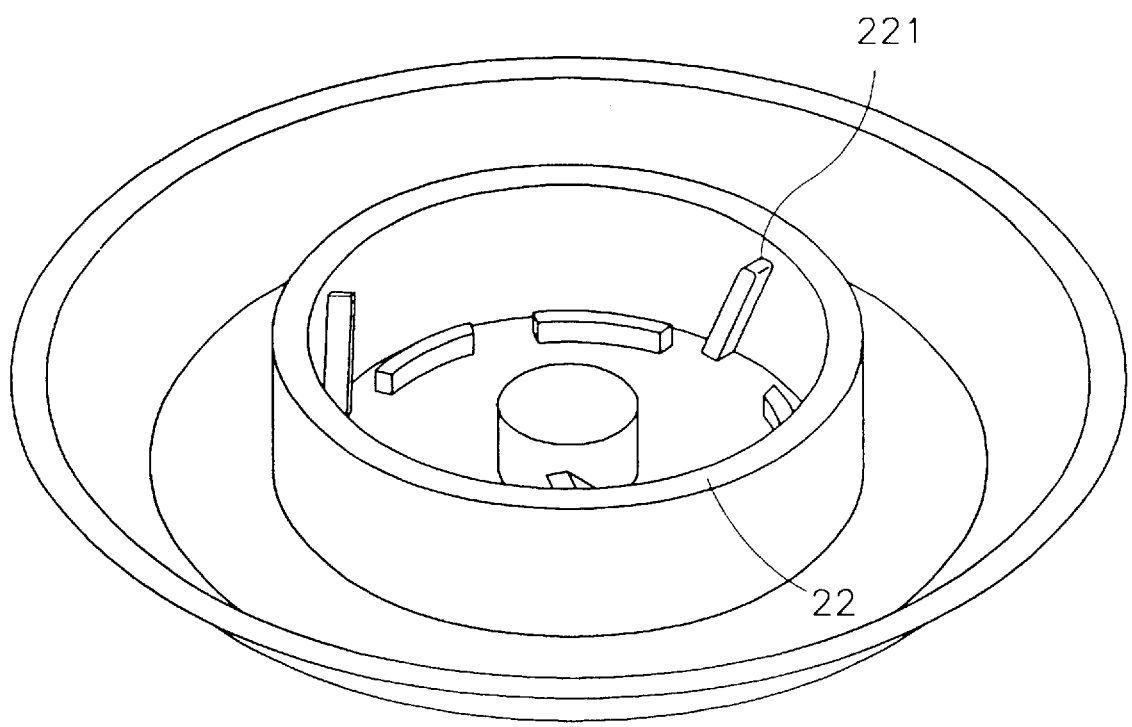
FIG. 2 is a perspective view of the third tooth element on the carrier of the present invention.

The carrier 22 is formed like a circular pan. It is held by the rim 214 of the lower support 21. The lower side of the carrier 22 has a third tooth element 221, as shown in FIG. 2. The third tooth element 221 extends downwards, having several inclined protrusions, the position and inclination angle of which correspond to the gaps 121 of the second tooth element 12, such that the second and third tooth elements 12, 221 are engaged with each other. Thereby the carrier 22 rotates around its center, as driven by the rotation of the second tooth element 12. The inclination of the gaps 121 ensures that the carrier 22 during its rotation will not rise and separate from the second tooth element 12. From the center of the carrier 22 a fixing element 222 extends upwards, so as to fix the processing unit 23.

The processing unit 23 is shaped as a circular plate. It is fixed on the upper side of the carrier 22. The processing unit has on its upper side a grinding area 231. When the processing unit 23 rotates, driven by the carrier 22, rice on the grinding area 231 is grinded, such that rice milk is produced. The rice milk is collected in the flow channel 215 of the lower support 21 and flows out through the outlet hole 215.

The casing 24 encloses the processing unit 23. It is open on its lower side. It is supported by the lower support 21. Inside the casing 24 the rice is processed. The lower part of the casing 24 is a peripheral wall 241, which is put over the protruding seat 14. On the position of the blocking elements 141 of the protruding seat 14, the peripheral wall 241 has openings 242. The openings 242 are held by the blocking elements 141, such that the casing 24 is blocked from being removed. Only when, by pressing the release buttons 16, the blocking elements 141 retreat from the openings 242, the casing 24 is released.

The upper side of the casing 24 has an insertion hole 243, which is concentric with the processing unit 23. On the periphery of the insertion hole 243, fixing parts 244 are provided to hold the inlet 25.

The inlet 25 is shaped like a pot. When mounted, it is placed in the insertion hole 243 and turned into a final angular position, where it is held by the fixing parts 244. On the top side, the inlet 25 has a feeding hole 251, which goes through the inlet 25, such that raw material (rice) fed from the outside falls on the processing unit 23. A funnel 252 with a funnel tube 253 at its bottom is set on the feeding hole 251.

The funnel 252 carries the dripping dish 26. The dripping dish 26 has on its bottom a dripping hole 261, through which drops of water are added to the raw material on the processing unit 23. A plate 262 partly covers the dripping hole 261. The plate 262 is of elongated shape, with one end in a fixed position and the plate rotatable around a vertical axis through this end. Thereby the open cross-section of the dripping hole 261 is adjustable according to the desired amount of water dripping on the processing unit 23.

Referring to FIG. 5, in the processing part 2a for grinding soya, as compared to grinding rice, an additional sieve 223a rests on the carrier 22. The sieve 223a is shaped like a truncated cone. It extends upwards from the carrier 22 with widening diameter. Its upper periphery leans against the inner side of the peripheral wall of the lower support 21a. The sieve 223a holds back the solid waste generated from grinding soya.

The lower support 21a further has an outlet path 216a on its peripheral wall near the top thereof. The outlet path 216a extends away from the peripheral wall of the lower support to a position above the container 18. Thereby, waste held back by the sieve 223 is collected in the container 18.

Figure 7:
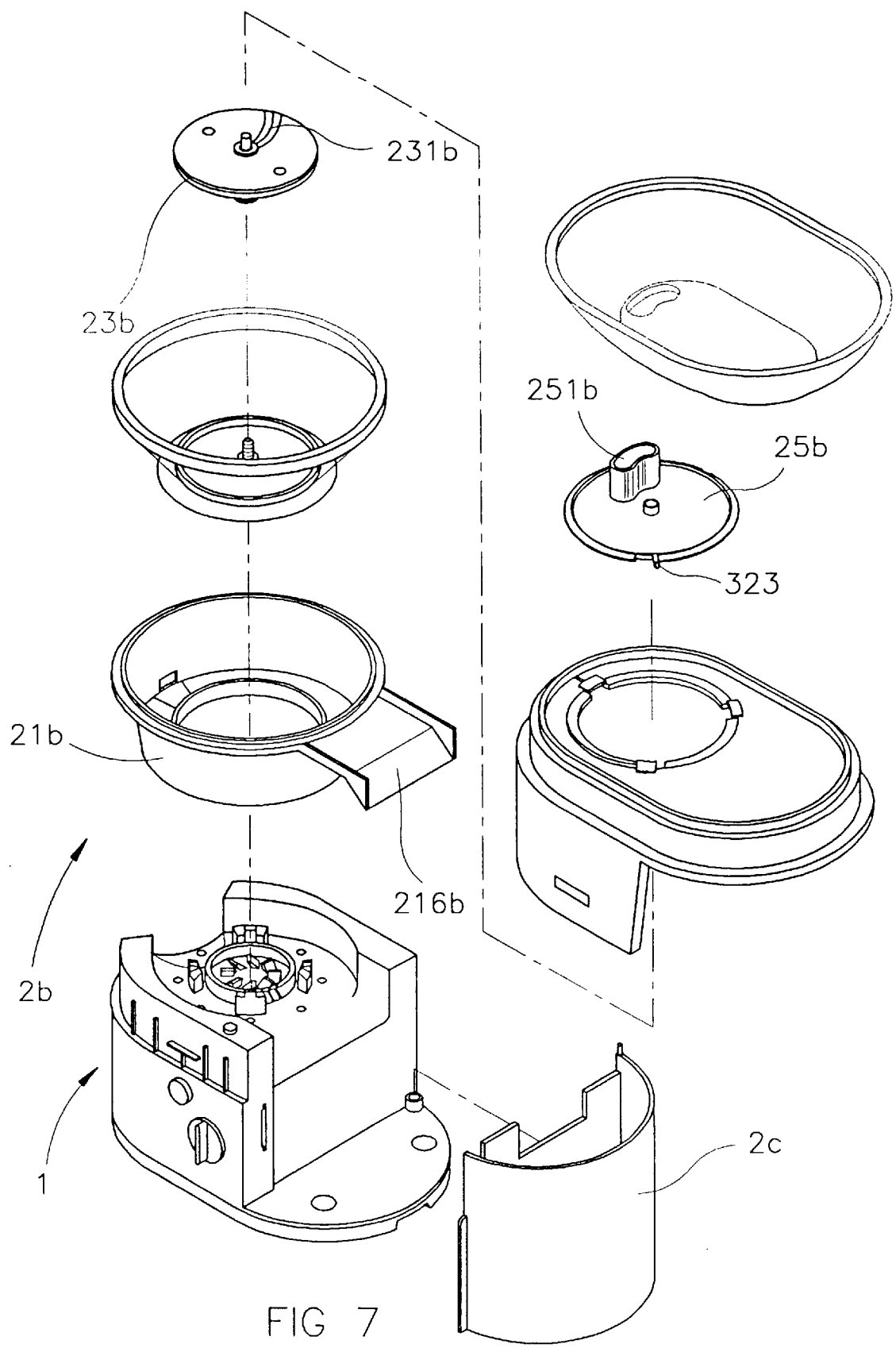
FIG. 7 is a perspective exploded view of the present invention, when used for cutting food into slices.
Figure 8:
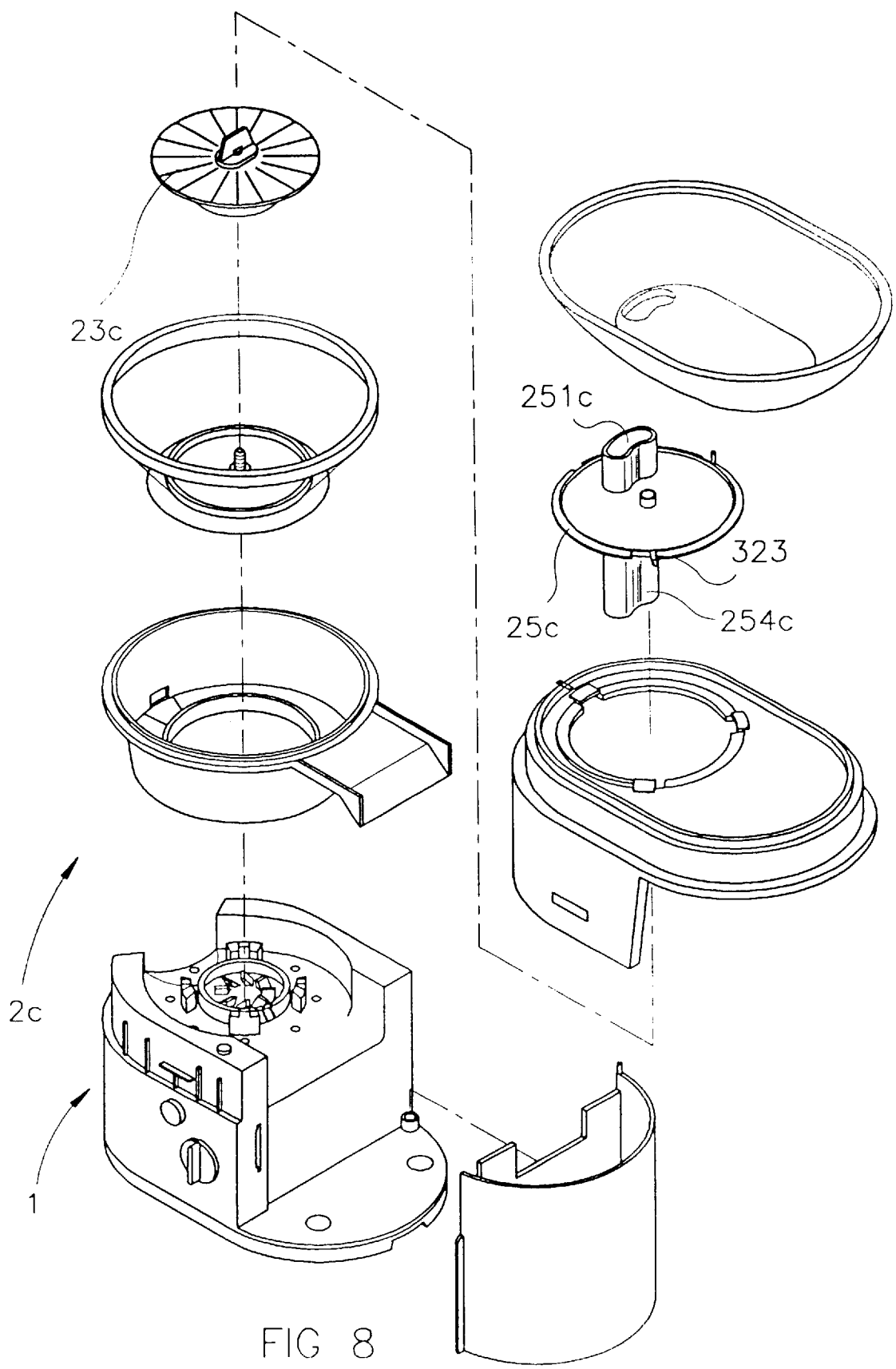
FIG. 8 is a perspective exploded view of the present invention, when used as a juice press.
Figure 9:
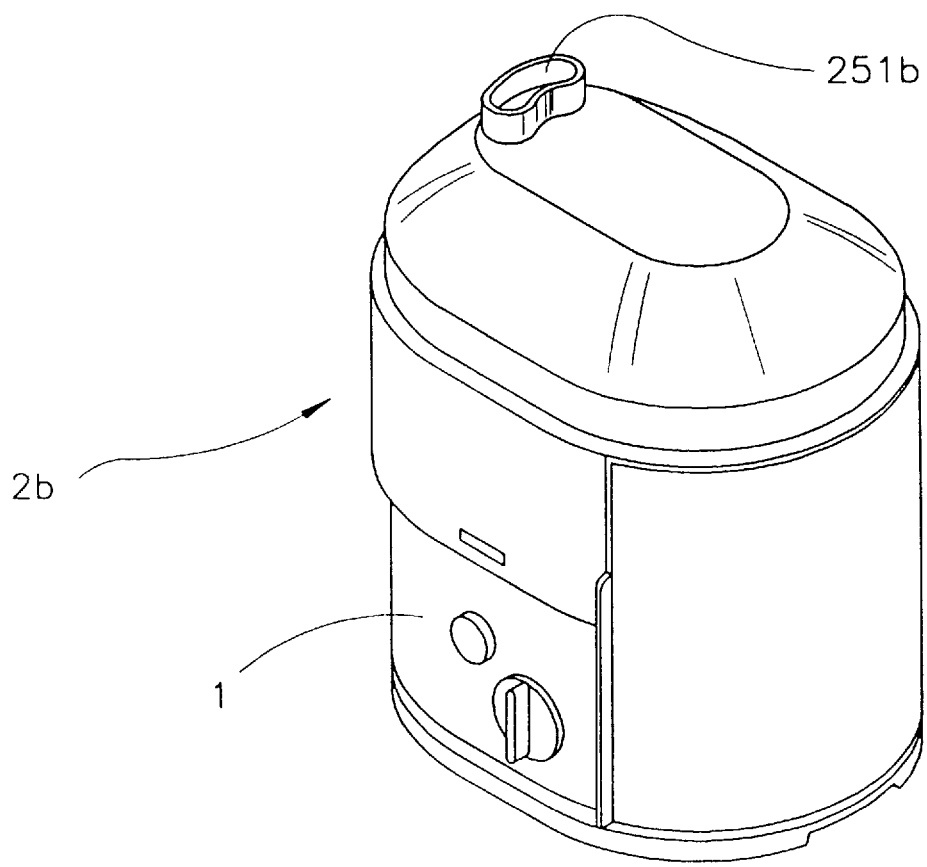
FIG. 9 is an outside view of the assembled multifunctional food processing machine of the present invention, when used for cutting food into slices or as a juice press.

As shown in FIGS. 7–9, for cutting raw material into slices, the processing part 2b has a processing unit 23b, the upper surface of which is a cutting area 231b provided with several blades. The slices cut by the processing unit 23b pass through the outlet path 216b and fall into the container 18.

In the processing part 2b, a disc-shaped inlet 25b is substituted for the inlet 25. The inlet 25b has an eccentric feeding hole 251b, from which a tube extends upwards. The food to be cut into slices is pressed through the feeding hole 251b on the cutting area 231b of the processing unit 23b.

Referring to FIG. 8, in the processing part 2c, a processing unit 23c for pressing juice is substituted for the processing unit 23b. An inlet 25c with a feeding hole 251c and an additional feeding tube 254c is substituted for the inlet 25b. The feeding tube 254c extends downwards until close to the processing unit 23c. Food pressed through the feeding tube 254c is grinded on the cutting area 231b of the processing unit 23b, producing juice.

Figure 3:
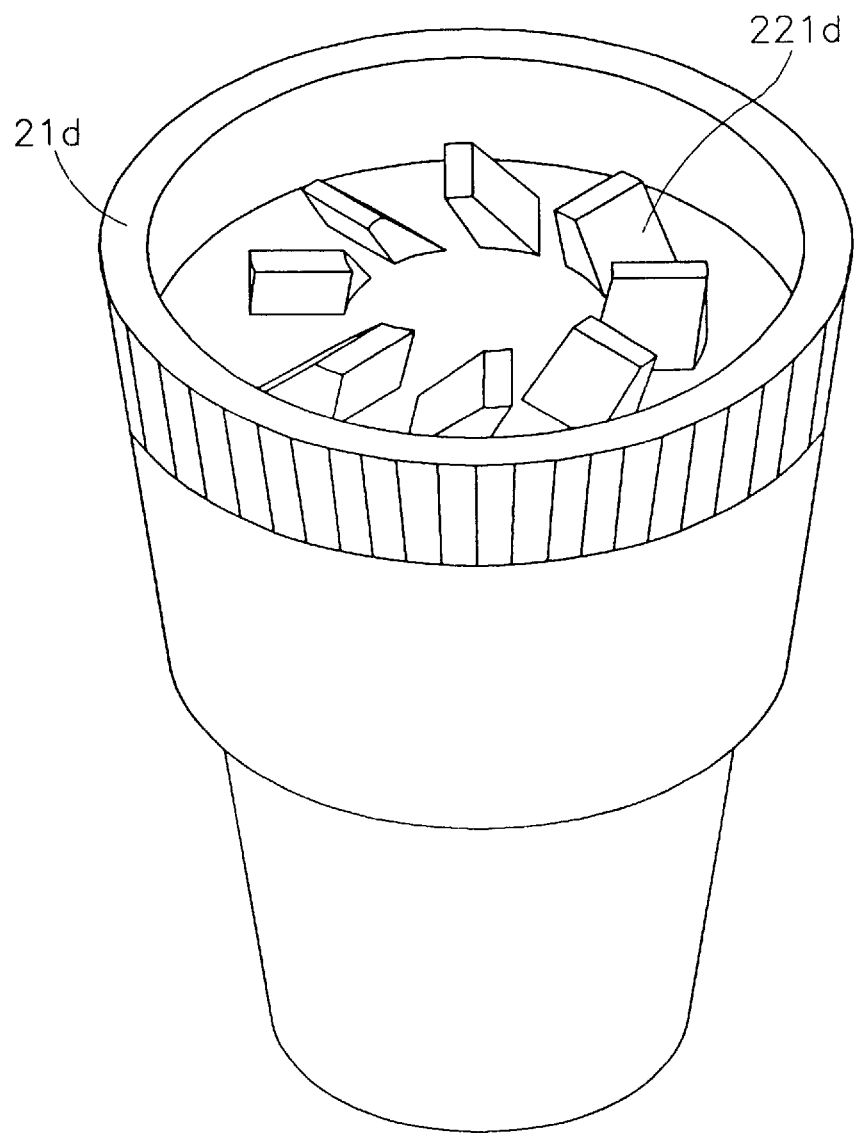
FIG. 3 is a perspective view of the third tooth element on the ring-like support of the present invention.
Figure 10:
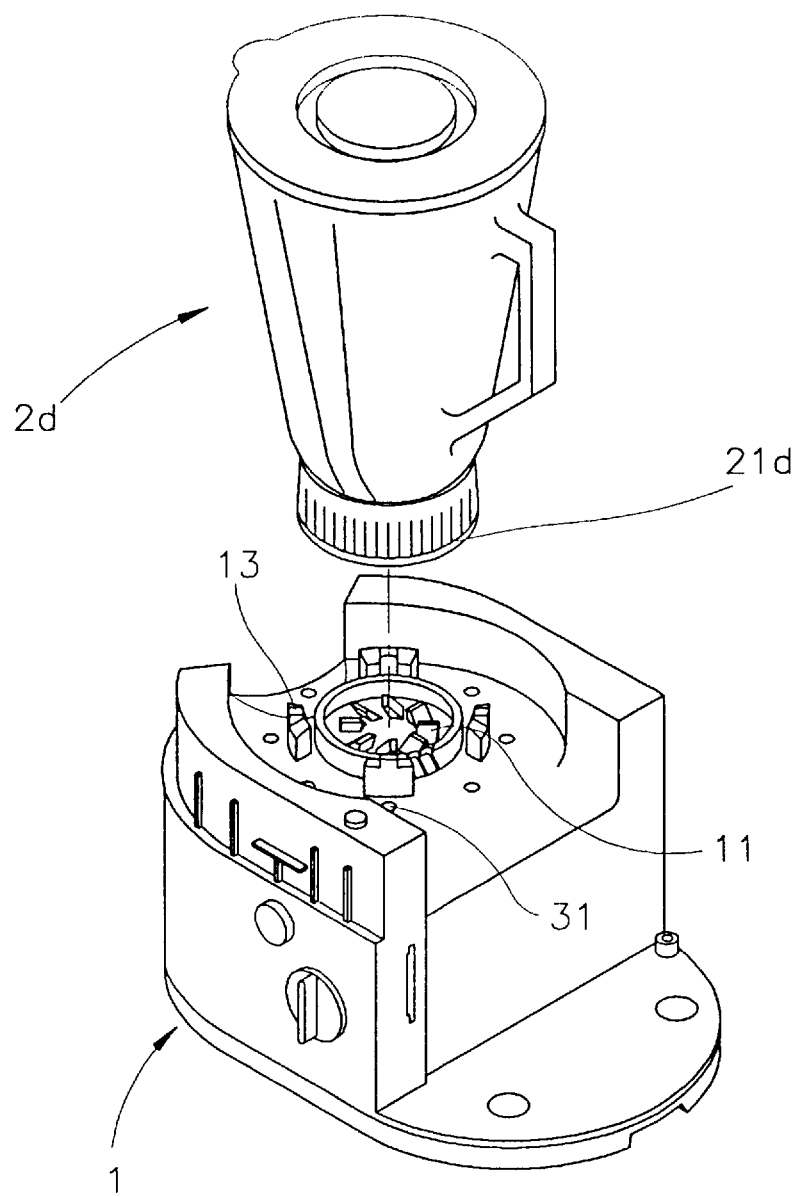
FIG. 10 is a perspective view of the present invention, when used for mixing juice.
Figure 11:
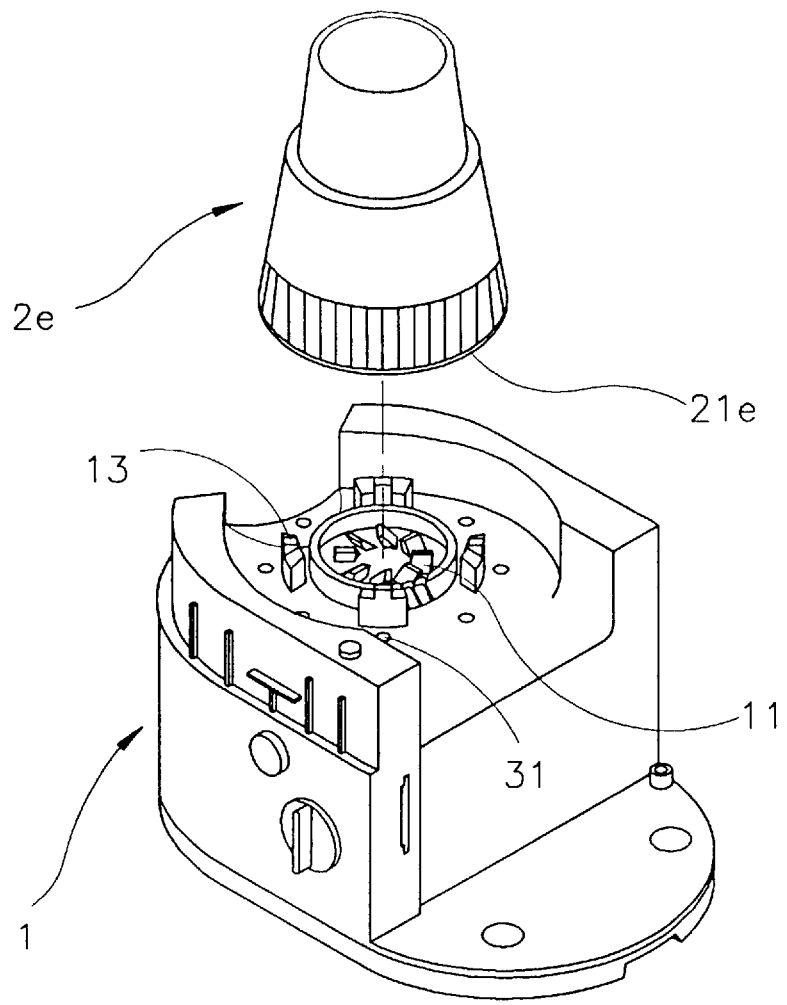
FIG. 11 is a perspective view of the present invention, when used as a coffee mill.

As shown in FIGS. 10 and 11, the processing parts 2d, 2e for mixing juice and grinding coffee have ring-like supports 21d, 21e, which are respectively put on the main unit around the holders 13. The lower side of the ring-like supports 21d, 21e have third tooth elements 221d, 221e, as shown in FIG. 3. Each of the third tooth elements 221d, 221e extends downwards, having several inclined protrusions, the position and inclination angle of which correspond to the gaps 121 of the second tooth element 12, such that the second tooth element 12 and the third tooth element 221d, 221e are engaged with each other. Thereby the third tooth element 221d, 221e is driven by the rotation of the second tooth element 12. The inclination of the gaps 121 ensures that the third tooth element 221d, 221e during its rotation will not rise and separate from the second tooth element 12.

As can be seen from this description, the multifunctional food processing machine of the present invention is adapted to a different use by exchanging structural elements of the processing part, without having to use tools. So switching between different functions is convenient.

Figure 12:
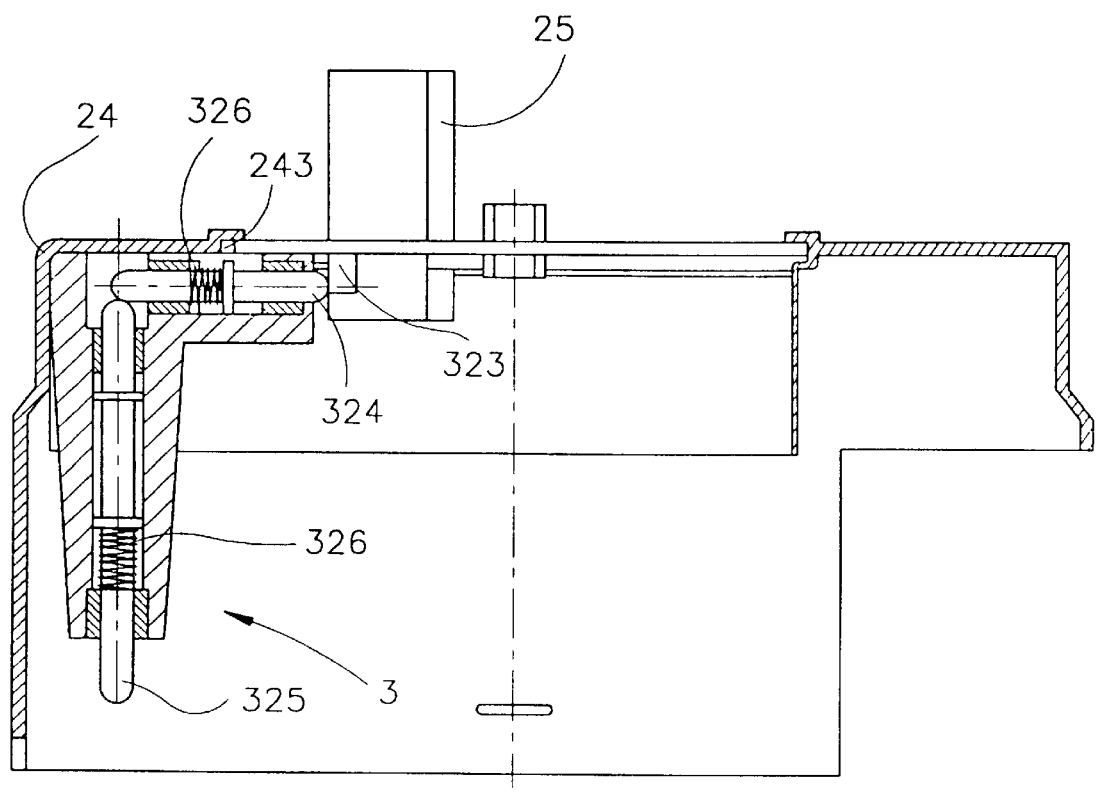
FIG. 12 is a schematic illustration in section of the second safety unit of the present invention.

Moreover, the present invention is equipped with two safety devices 3 for the safety of the user. As shown in FIGS. 1 and 12, the safety device 3 comprises a first safety unit 31 and a second safety unit 32. The first and second safety units 31, 32 control the operation of the switch 15 via independent circuits. The first safety unit 31 is installed on the upper side of the main unit 1 outside the circumference of the holders 13. It is pressed on by the ring-like supports 21d, 21e, when one of the processing parts 2d, 2e is installed. Then the switch 15 is enabled to close and to connect power to the motor. When none of the processing parts 2d, 2e is installed, the switch 15 is kept open, and no power is supplied to the motor.

The second safety unit 32 comprises a push button 321, a transmission system 322, and a pusher 323. The pusher 323 protrudes from the periphery of the inlet 25 of the processing part 2 close to the bottom side thereof. When the inlet 25 is put in the insertion hole 243 on the casing 24 and turned into its final angular position, the pusher 323 displaces the transmission system 322, indicating that the inlet 25 sits tightly on the casing 24.

The transmission system 322 is mounted on the casing 24. It has a horizontal bar 324 and a vertical bar 325. The horizontal bar 324 is glidingly mounted below the top side of the casing 24. It extends to the periphery of the insertion hole on the casing 24, contacting the pusher 323, when the inlet 25 is inserted and brought into its final angular position. The other end of the horizontal bar 324 contacts the upper end of the vertical bar 325. The vertical bar 325 is vertically glidable. It extends down to the upper side of the protruding seat 14 of the main part 1, when the casing 24 is set on the main part 1. When the inlet 25 is inserted into the insertion hole 243, the horizontal bar 234 is pushed away therefrom, in turn pushing down the vertical bar 325, which then presses on the push button 321.

The push button 321 controls the operation of the switch 15. When the casing 24 is set on the main part 1 and the inlet 25 is put on the casing 24, the push button 321 is pressed on by the vertical bar 325, enabling the switch 15 to close and to connect power to the motor. After removing the inlet 25 or the casing 24, the switch 15 is kept open, and no power is supplied to the motor. Thereby, the food processing machine of the present invention will not operate unless completely set up, enhancing the safety of its operation.

Springs 326 on the horizontal bar 324 and on the vertical bar 325 ensure that, after removing the inlet 25, the horizontal bar 324 and the vertical bar 325 return to the position, in which the push button is not pressed on and the switch 15 is kept open.

What is claimed is:

1. A multifunctional food processing machine, comprising:
    a main part with an upper side, a lower side, a front side and a back side, having a first tooth element on said upper side, a second tooth element around said first tooth element on said upper side and a motor, which drives a rotational movement of said first and second tooth elements, said motor being controlled by a switch; and
    a processing part with a bottom side, said bottom side sitting on said upper side of said main part, said processing part having a casing, a rotatable third tooth element, which engages with said first tooth element or said second tooth element, and a processing unit, which is connected with said third tooth element, rotating therewith, and housed in said casing;
    wherein said processing unit rotates, as controlled by said switch, so as to process food.

2. A multifunctional food processing machine according to claim 1, wherein said main part on said lower side has a horizontally extending base, which supports a container for accommodating residue after processing said food.

3. A multifunctional food processing machine according to claim 2, wherein said container is hingedly connected to said main part.

4. A multifunctional food processing machine according to claim 1, wherein said main part on said upper side around said second tooth element has several holders to fix said processing part.

5. A multifunctional food processing machine according to claim 1, wherein said first tooth element has several upward extending, inclined protrusions, which are under mutually equal distances arranged in a circle.

6. A multifunctional food processing machine according to claim 1, wherein said second tooth element has several downward extending, inclined incisions, which are under mutually equal distances arranged on a circular protruding rim.

7. A multifunctional food processing machine according to claim 1, wherein said main part on said front side and said back side has blocking elements, which prevent said casing of said processing part from being removed, when said processing part is put on said main part.

8. A multifunctional food processing machine according to claim 7, wherein said main part on said front side and said back side has two release switches, so as to control the blocking and unblocking of said casing on said main part.

9. A multifunctional food processing machine according to claim 1, wherein said main part has two safety switches for ensuring that said processing part is properly set on said main part, when said multifunctional food processing machine is operated.

10. A multifunctional food processing machine according to claim 1, wherein said processing part grinds rice, soya and coffee, presses and mixes juice, and cuts food into slices.

11. A multifunctional food processing machine according to claim 1, wherein said processing part comprises:
    a lower support, roughly shaped like a pot, with a lower side and a periphery, said lower side of said lower support having a concentric fixing hole of a smaller diameter, leaving a flow path around said hole, said periphery close to said lower side having an outlet hole;
    a carrier, roughly shaped like a circular pan, having a lower and an upper side, rotatably set on said fixing hole of said lower support, a third tooth element being attached on said lower side of said carrier, which is thereby rotationally driven by said main part, said upper side of said carrier having an upward extending fixing element;
    a processing unit, roughly shaped like a disc, having an upper side, on the surface of which said food is processed, said processing unit fixed to said upper side of said carrier;
    a casing with a top side, set on said lower support, said top side having an insertion hole, which is concentric with said processing unit;
    an inlet with an upper side, a lower side and a periphery, rotatably inserted into said insertion hole and held therein in a final angular position, said inlet having a feeding hole, which connects said upper side of said inlet with said processing unit, so as to feed in said food to be processed;
    a safety device, having a horizontally glidable horizontal bar with a first and a second end, a vertically glidable vertical bar with an upper and a lower end, and a pusher protruding from said periphery of said inlet near said lower side thereof, said first end of said horizontal bar extending to said insertion hole, said second end of said horizontal bar contacting said upper end of said vertical bar, wherein, when said inlet is inserted into said insertion hole and rotated into said final angular position, said pusher pushes said horizontal bar away from said insertion hole, and said horizontal bar in turn pushes down said vertical bar, which then presses down on said main part, indicating that said processing part is properly set on said main part;
    wherein by rotating said processing unit, as driven by said main part, food fed through said inlet is processed, with processed food being let out through said lower support.

12. A processing part for a multifunctional food processing machine according to claim 11, wherein said carrier further has a sieve to hold back residue after processing said food.

13. A processing part for a multifunctional food processing machine according to claim 11, wherein said processing unit grinds rice, soya and coffee, presses and mixes juice, and cuts food into slices.

14. A processing part for a multifunctional food processing machine according to claim 11, wherein said horizontal bar and vertical bar have devices letting them return to their original position after being pushed away.

15. A processing part for a multifunctional food processing machine according to claim 11, wherein said feeding hole carries a funnel, on which in turn a dripping dish is mounted, so as to add water for grinding rice or soya.

16. A processing part for a multifunctional food processing machine according to claim 15, wherein said dripping dish is provided with a movable plate for adjusting the amount of water dripping out.

* * * * *